(12) United States Patent
Shankar et al.

(10) Patent No.: US 8,452,821 B2
(45) Date of Patent: May 28, 2013

(54) EFFICIENT UPDATES FOR DISTRIBUTED FILE SYSTEMS

(75) Inventors: Ramesh Shankar, Redmond, WA (US); Daniel Edward Lovinger, Seattle, WA (US); Chien-Lung Yu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 12/013,284

(22) Filed: Jan. 11, 2008

(65) Prior Publication Data

US 2009/0006468 A1 Jan. 1, 2009

Related U.S. Application Data

(60) Provisional application No. 60/946,994, filed on Jun. 29, 2007.

(51) Int. Cl.
*G06F 17/30* (2006.01)
(52) U.S. Cl.
USPC ............... 707/822; 707/736; 707/999.103; 707/803
(58) Field of Classification Search
USPC ............... 707/736, 471, 803, 999.103, 822
See application file for complete search history.

(56) References Cited

U.S. PATENT DOCUMENTS

| | | | |
|---|---|---|---|
| 5,617,568 A | 4/1997 | Ault et al. | |
| 6,209,036 B1 | 3/2001 | Aldres et al. | |
| 6,625,604 B2 | 9/2003 | Muntz et al. | |
| 6,789,204 B2 * | 9/2004 | Abdelnur et al. | 726/1 |
| 6,925,515 B2 | 8/2005 | Burns et al. | |
| 7,043,485 B2 | 5/2006 | Manley et al. | |
| 7,240,114 B2 | 7/2007 | Karamanolis et al. | |
| 2001/0032320 A1 * | 10/2001 | Abdelnur et al. | 713/201 |
| 2004/0205143 A1 | 10/2004 | Uemura | |
| 2006/0053147 A1 * | 3/2006 | Wahlert et al. | 707/102 |
| 2006/0053178 A1 | 3/2006 | van Ingen et al. | |
| 2006/0085428 A1 | 4/2006 | Bozeman et al. | |
| 2006/0173956 A1 | 8/2006 | Ulrich et al. | |
| 2007/0022087 A1 | 1/2007 | Bahar et al. | |
| 2007/0088669 A1 | 4/2007 | Jaschek et al. | |
| 2007/0094354 A1 | 4/2007 | Soltis | |

FOREIGN PATENT DOCUMENTS

| | | |
|---|---|---|
| JP | 5-265829 | 10/1993 |
| JP | 7-210443 | 8/1995 |
| JP | 11-15722 | 1/1999 |
| JP | 2004-240803 | 8/2004 |
| WO | 2004042618 A2 | 5/2004 |

OTHER PUBLICATIONS

Screenshot of MS-DFSNM: Distributed File System (DFS): Namespace Management Protocol Specification.*

(Continued)

*Primary Examiner* — Mahesh Dwivedi
(74) *Attorney, Agent, or Firm* — Workman Nydegger

(57) ABSTRACT

A directory services implementation is provided to associate distributed file system (DFS) links with individual directory objects, and metadata to attributes thereof, to allow leveraging directory services features for DFS for a given namespace. For example, updating directory objects with modified metadata related to DFS links requires only that the directory object related to the link be updated rather than an entire directory object related to the corresponding namespace. Moreover, directory services functionalities such as querying can be utilized with DFS to provide efficient location of updated records. In this regard, efficient replication of DFS throughout a network is facilitated.

20 Claims, 10 Drawing Sheets

OTHER PUBLICATIONS

Dhruba Borthakur. The Hadoop Distributed File System: Architecture and Design. http://lucene.apache.org/hadoop/hdfs_design.pdf. Last accessed on Jul. 19, 2007.

Kevin Fu, et al. Fast and Secure Distributed Read-Only File System. Feb. 2002. http://delivery.acm.org/10.1145/510000/505453/p1-fu.pdf?key1=505453&key2=4653284811&coll=GUIDE&dl=GUIDE&CFID=28875249&CFTOKEN=90749616.

Kiron Vijayasankar. File System and Storage Integrity. http://www.fsl.cs.sunysb.edu/~kvijayas/File%20system%20and%20Storage%20Integrity.pdf. Last accessed on Jul. 19, 2007.

International Search Report dated Oct. 31, 2008 for PCT Application Serial No. US2008/066740, 3 Pages.

Mitsuo Koikawa, "Web Technology in the era of 2000, Special Version: the first round," Visual Basic magazine, vol. 6, No. 10, pp. 298 to 306, Shoeisha.Co., Ltd., Japan, Aug. 1, 2000.

* cited by examiner

EFFICIENT UPDATES FOR DISTRIBUTED FILE SYSTEMS

CROSS-REFERENCE TO RELATED APPLICATION(S)

This application claims the benefit of U.S. Provisional Patent Application Ser. No. 60/946,994 filed on Jun. 29, 2007, entitled "EFFICIENT METADATA UPDATES FOR DOMAIN SCALED DISTRIBUTED FILE SYSTEMS," the entirety of which is incorporated herein by reference.

BACKGROUND

The evolution of computer networking technologies in the workplace, and the world-over (e.g., the Internet), has provided substantial increase in productivity. In particular, many tasks have become automated, and various valuable services are provided to promote increased communication, workflow, and effectiveness of many businesses and personal applications. Networking technologies provide sharing functionality whereby users or applications can share logical partitions of data with other users and applications. For example, a user can share a folder with one or more other users by allowing the users to directly access the folder, subject to some authorization rules, via the network. This functionality is provided by implementing applications or services that leverage directory services, which define and manage identity aspects of various user accounts and network resources, for example. Lightweight directory access protocol (LDAP) is an example of a directory services implementation that operates over a network protocol such as transmission control protocol/internet protocol (TCP/IP). LDAP can be distributed across multiple network devices to provide replicated services for efficiency and accessibility; the LDAP service devices can be synchronized through updating procedures defined by the LDAP implementation.

In more recent technology, distributed file systems (DFS) have been implemented to provide access to multiple network resources in a single seamless link, called a DFS link; such access is typically provided for given namespaces. A DFS root target server hosts one or more namespaces having multiple DFS links; the DFS root target servers collect and manage DFS link data for subsequent access. Directory services implementations (e.g., LDAP) have been utilized to provide this functionality by allowing DFS root nodes to store the link data related to a namespace in a specific directory object related to the namespace. In this implementation, attributes of the namespace directory object relate to the various shares of the namespace. When operating with multiple directory services implementations, or when updating cache to a DFS root target server, updates to a single DFS link requires that the directory object related to the entire namespace be transferred among the DFS root target servers and stored to provide up-to-date link information for the entire namespace.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Efficient updating of metadata related to distributed file system (DFS) functionality is provided where DFS links or shares can be stored as single directory objects using directory services, for example. Thus, by providing this additional level of granularity, only the directory object associated with a single DFS link need be updated upon modification of data related to the link rather than a single directory object related to the entire namespace. Moreover, storing the DFS links as directory objects and populating attributes of the objects with metadata related to the links allows the directory services implementation to be utilized to provide additional services to the data. For example, the DFS link data can be schematized to facilitate standardizing the data for compatible querying and/or interpreting thereof. Moreover, the querying functionality of the directory services implementation can be utilized in connection with the DFS links as well, for example, to search relevant records in a given operation (such as an update operation).

In one example, a DFS link can be defined as an aggregation of one or more available network resources and stored as a single lightweight directory access protocol (LDAP) object in an LDAP implementation. Furthermore, data related to the DFS link, such as location of the network resources, authorization information related thereto, and other information (as described herein) can be stored as metadata related to the link. Upon updating data related to the link and/or the link itself (e.g., adding or deleting a link), the LDAP object associated with the single link can be updated. Moreover, notifications can be sent to one or more DFS root targets (or the DFS root targets can poll an LDAP component) regarding existence of an update; LDAP querying functionality can be used to locate updated records to ensure replication of the DFS data within a namespace.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
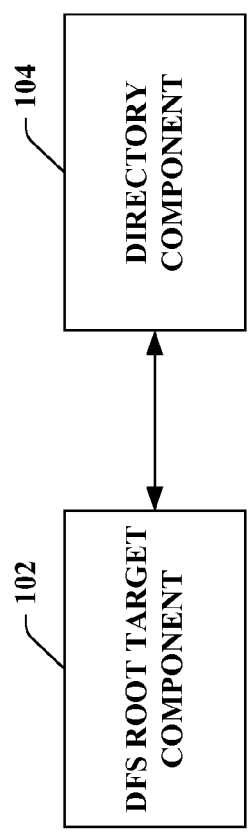
FIG. 1 illustrates a block diagram of an exemplary system that facilitates storing distributed file system (DFS) namespace data into disparate directory objects.

Efficient metadata updating for distributed file systems (DFS) is provided where functionalities such as directory services can be leveraged to offer added value with respect to the DFSs and/or the associated metadata. Definitions for DFS can be generated as one or more directory objects having metadata stored as attributes of the objects such that updates to the definitions can occur efficiently by using directory services to update only objects related to single definitions as changes occur; likewise, searching, schema validation, and other directory properties can be utilized in connection with the definitions. In this regard, the DFS definitions are spread out as one or more independent self-contained resources or objects in a directory services implementation such that updating the data does not require transport, processing, and/ or updating a single resource related to all definitions of a single namespace.

According to an example, DFS services can be offered for a given domain. The domain can have associated domain controllers that can manage directory databases used to store DFS information, and update remaining domain controllers with information received, for example. A DFS link can be defined by a DFS node comprising one or more aggregated resources (or shares) on the domain; the metadata for the definition can be stored as or within one or more directory objects. It is to be appreciated that the metadata at least comprises data that can be utilized to properly access the DFS link. In this example, though many other DFS links can exist within the namespace and/or on the domain controller or DFS node, the domain controller can update respective directory information to reflect the new link simply by adding the directory object related to the DFS link. In this regard, data related to one or more DFS links can be stored and/or managed as distinct directory objects though more links can be present in a given namespace, as opposed to implementing one directory object for an entire namespace expressing DFS links as attribute data for the directory object. Moreover, disparate directory objects or DFS nodes can update local information via adding the single object instead of replacing and/or communicating an entire object related to a given namespace. This provides for more efficient updating of DFS information and can allow other functionalities of a directory services implementation to be utilized in connection with the links as will be described in further detail.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Now turning to the figures, FIG. 1 illustrates a system 100 that facilitates defining DFS links as one or more directory objects. A DFS root target component 102 is shown that provides the DFS functionality for one or more namespaces as well as a directory component 104 that can house metadata for one or more defined DFS namespaces to provide efficient information storage, sharing, and updating thereof. According to an example, the DFS root target component 102 can establish a DFS link (which can belong to a namespace, for example) and provide metadata related to the link to the directory component 104 such that the directory component 104 can be leveraged to provide additional value to the metadata as well as metadata associated with other DFS links.

The DFS root target component 102 can be utilized to define and manage a number of DFS links that relate to one or more aggregated resources where the resources can be shared locally and/or over a network or domain via the link, for example. Shareable resources can comprise, but are not limited to, software or operating system resources (e.g., files, folders, accounts, credentials, etc.), hardware resources (such as I/O devices including printers, drives, scanners, processors, physical memory, etc.) and/or the like. According to an example, the DFS root target component 102 can define a single DFS link for an aggregation of a portion of a plurality of shared resources, such as folders or directories. Thus, a single link can be requested from the DFS root target component 102 that provides access to the plurality of resources, though the resources can appear as a single resource to an end-user. In this regard, the DFS root target component 102 can host DFS links for one or more DFS namespaces. It is to be appreciated that the DFS link can relate to a single device having a single or multiple share points as well. The DFS links defined by the DFS root target component 102 can span resources available over an entire domain, for example, and/ or resources managed by a specific domain controller; metadata related to the links and/or definition thereof can be comprised within the directory component 104, as attributes of one or more objects related to a given link, for example.

The directory component 104 can provide a directory services implementation with a number of value added services, including searching, modifying, distributing, automatic updating, and/or the like. The directory services implementation, for example, can provide for storage and management of local and/or remote network resources where the directory component 104 allows access of such, as described, by way of one or more communications protocols (such as transmission control protocol/internet protocol (TCP/IP), user datagram protocol (UDP), point-to-point protocol (PPP), and/or the like, for example). In one example, a lightweight directory access protocol (LDAP), which can utilize TCP/IP to communicate directory services data, can be utilized by the directory component 104. The directory component 104 can be implemented in a variety of configurations to provide the foregoing functionalities (e.g., including a relational database, hierarchical file or database, flat file, comma separated value file, executable program or service, and/or the like) and can be distributed as well (e.g., part of a plurality of directory components that provide redundant/replicated data and/or services to a plurality of network resources). The directory component 104 can comprise a number of directory objects related to various resources on the network, as described, and can allow the aforementioned value added services to be performed with respect to the directory objects. Thus, the DFS links for a given namespace can each relate to one or more directory objects of the directory component 104 that do not necessarily relate to the totality of links for the given namespace; in this regard, DFS link information can be searched, modified, distributed, updated, and/or otherwise accessed by leveraging the directory component 104 and/or its provided services. Additionally, when changes occur to metadata, the directory object related to a given link and not the totality of links in a namespace can be transferred to disparate DFS root target components rather than a directory object related to substantially all links in the namespace, for example, providing more efficient updating.

Figure 2:
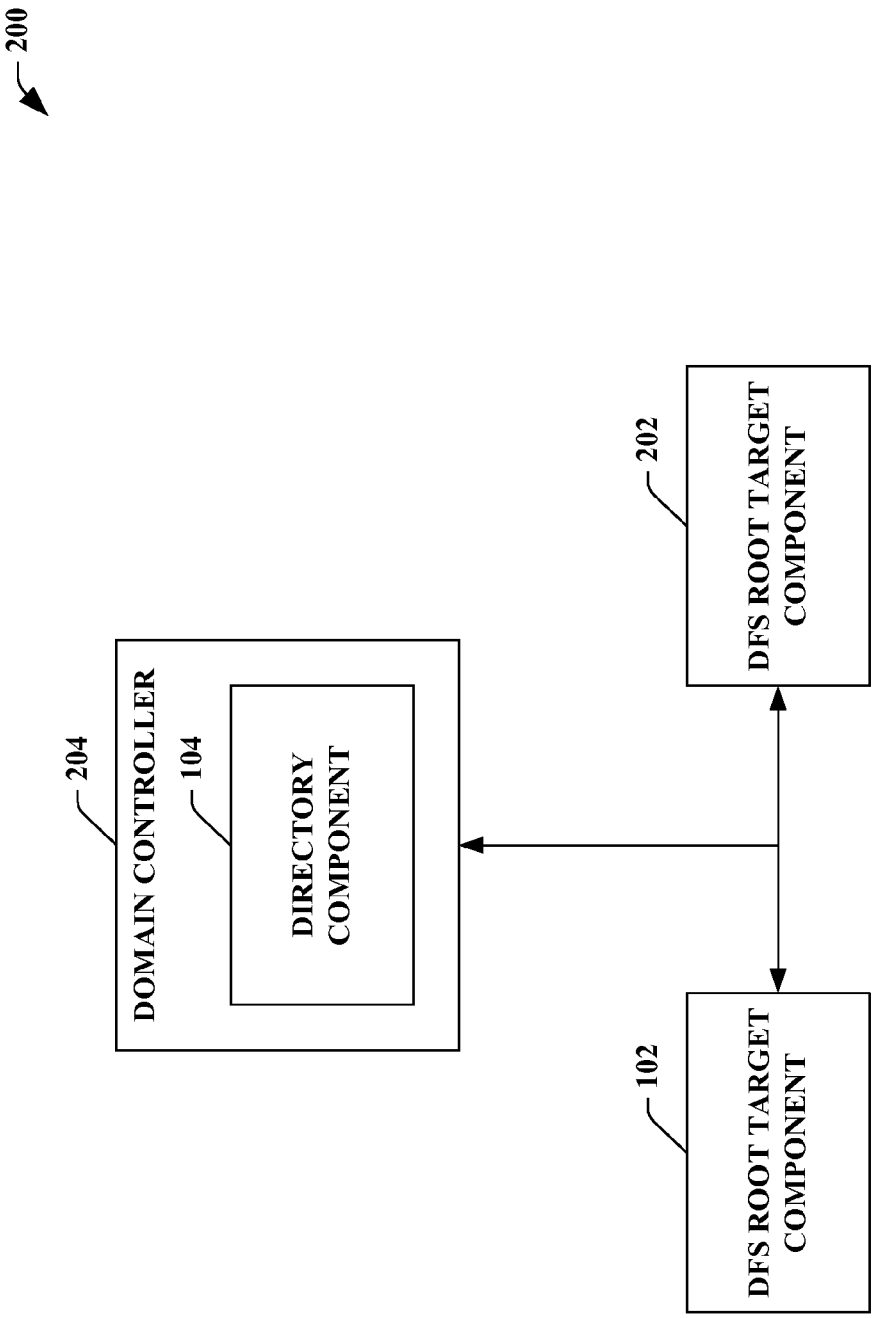
FIG. 2 illustrates a block diagram of an exemplary system that facilitates updating objects and metadata of DFS root target components.

Referring to FIG. 2, an example system 200 for utilizing directory services to store and utilize metadata related to DFS links is shown. DFS root target components 102 and 202 are provided to allow one or more links to be defined regarding accessing aggregated and/or single resources on in a local or network environment. Moreover, a domain controller 204 is displayed to provide services related to one or more network domains to a plurality of network clients (not shown); the domain controller comprises a directory component 104 that is leveraged to offer directory services as part of the domain controller 204, for example. In one example, the domain controller 204 can participate in a network domain, and the directory component 104 can organize and provide information related to DFS links available in the domain from the DFS root target components 102 and 202. The domain controller 204 can leverage the directory component 104 to provide directory services to domain resources, such as connected clients, allowing them to utilize DFS links defined by the DFS root target components 102 and 202 according to related data specified in the directory component 104.

According to an example, the directory component 104 can comprise information related to directory services corresponding to its respective domain controller 204; additionally, however, the directory component 104 can comprise information related to directory services stored in disparate directory components (not shown) and in this regard can be one of a plurality of replicated directory databases. As described, some information stored in the directory component 104 can relate to DFS links (e.g., links to an aggregation of one or more resources) for one or more given namespaces where each link corresponds to at least one of a plurality of objects in the directory component 104. The DFS root target components 102 and 202 can leverage the directory component 104 to obtain DFS metadata for providing DFS functionality to one or more network resources based on the data stored in the directory component 104. In one example, the DFS root target component 102 can be utilized to create a DFS link related to one or more network resources; data regarding the link (e.g., resource locations, authorization information, etc. as described infra) can be stored in one or more directory objects of the directory component 104 that relate to distinct DFS links and not necessarily to substantially all links of an entire namespace. The data can be updated to the DFS root target component 202 using substantially any update mechanism allowing the DFS root target component 202 to also provide access to the created DFS link.

As mentioned, the directory component 104 can store one or more directory objects per DFS link without having to store substantially all links for a given namespace; thus, if an update operation occurs on a DFS link, a DFS root target component need only update the one or more objects related to the DFS link as opposed to an object related to the entire namespace or to substantially all links of a given domain controller 204, for example. In one example, the DFS root target component(s) 102 and/or 202 can load a local cache or copy of the metadata. The DFS root target component(s) 102 and/or 202 can be notified that a change has occurred in one or more directory objects and can query the directory component 104, specifically for the directory objects related to the various DFS links, to obtain links of interest (e.g., links that have been updated) and update its local representation accordingly. It is to be appreciated that the querying functionality can be provided by the directory services implementation in one example. Moreover, the directory objects related to the link can have an associated identifier that can change when the object is updated (due to an update in the DFS link metadata attributes) where the change is propagated to the directory component 104; this value can be queried for inconsistency with a local value of a DFS root target component 102 and/or 202 to detect change. Thereafter, the DFS root target component(s) 102 and/or 202 can update their local data to provide access to the updated links. It is to be appreciated that link additions can be queried from the directory component 104 as well, and deletions can also be located where deleted DFS links can be soft-deleted from the directory component 104 such that the directory object exists, but an attribute thereof indicates deletion. Further, updates can occur using substantially any mechanism, such as pushing the updated directory object to the one or more DFS root target components 102 and/or 202, notification followed by a pull, as mentioned, and/or random, timed, or other event-driven pulling.

Upon initialization of DFS root target components 102 and 202, and/or at various times throughout their lives, a full synchronization can occur with the directory component 104 where substantially all data and metadata (e.g., directory objects and attributes) is downloaded from the directory component 104 and accessibly stored on the DFS root target components 102 and 202. As updates occur to directory data via disparate DFS root target components (e.g., DFS root target component 204), DFS root target component 202 can undergo an incremental update, for example, and vice versa. It is to be appreciated that DFS root target components 102 and 202 can both be incrementally updated when data is changed by a disparate DFS root target component as well. As described briefly, the incremental update can be performed by an event triggering querying of the directory component 104 for attribute values of DFS links indicating update. It is to be appreciated that the trigger can be an event received by the DFS root target components 102 and 202, a timer event, and/or the like. Moreover, the DFS root target component 102 and/or 202 can avoid performing updates on metadata that it updated within the directory component 104.

Additionally, a delete operation can be indicated by an attribute value of a directory object related to a DFS link (e.g., a soft delete) such that the DFS root target components 102 and 202 can discern the soft delete upon querying the directory component 104 and delete the local records accordingly. To this end, a dynamic object can be replicated corresponding to a DFS link with a delete value attribute where the dynamic object can be garbage collected by the directory component 104. Thus, if the creation is successful, the old object can be deleted, and the new object can be an indication of deletion for DFS root target component(s) 102 and/or 202 querying the directory component 104. Furthermore, other updating and deleting schemes are possible; for example, a lazy delete can occur where upon request for a DFS link, the DFS root target component 102 and/or 202 can check the directory component 104 for an appropriate object. If the object is gone, the link has been deleted, for example.

According to the described examples, services offered by the directory services implementation of the directory component 104 can be utilized with respect to the DFS links, such as searching for example. Therefore, available links, and data related thereto, can be queried by using the directory component 104 to locate one or more relevant links based on available search criteria as described, for example. Moreover, directory schema validation can be enforced, in an example, with respect to directory objects. With the DFS links separately relating to given directory objects, the same constraints can be imposed on the DFS links providing conformity of the link. Also, setting up a new DFS root target component or replicating an entire namespace can be more efficient as distinct directory objects related to the desired links (or links of a desired namespace), and not necessarily a directory object related to substantially all links of a namespace, can be transferred (asynchronously, for example) and utilized to configure the new DFS root target component.

Once DFS link data is updated, it can be utilized by one or more clients connected to the domain controller 204 and/or DFS root target component(s) 102 and/or 202 (or the domain controller 204 can leverage the DFS root target(s) 102 and/or 202 on behalf of a client or open a communications channel therebetween), for example. According to one example, one or more clients can access a DFS link, which can comprise an aggregated view of one or more network resources, though machine boundaries of the aggregation can be transparent to the client, as described. It is to be appreciated that the DFS root target component 102 and/or 202 can be single components related to a domain or distributed into one or more components (as shown) for replication and/or effective request handling, for example. Additionally, each DFS root target component 102 and/or 202 can provide DFS functionality according to one or more namespaces. As the DFS root target components 102 and 202 can provide replicated data, DFS links defined by one DFS root target component 102 can be utilized by clients or other devices leveraging DFS root target component 202.

Figure 3:
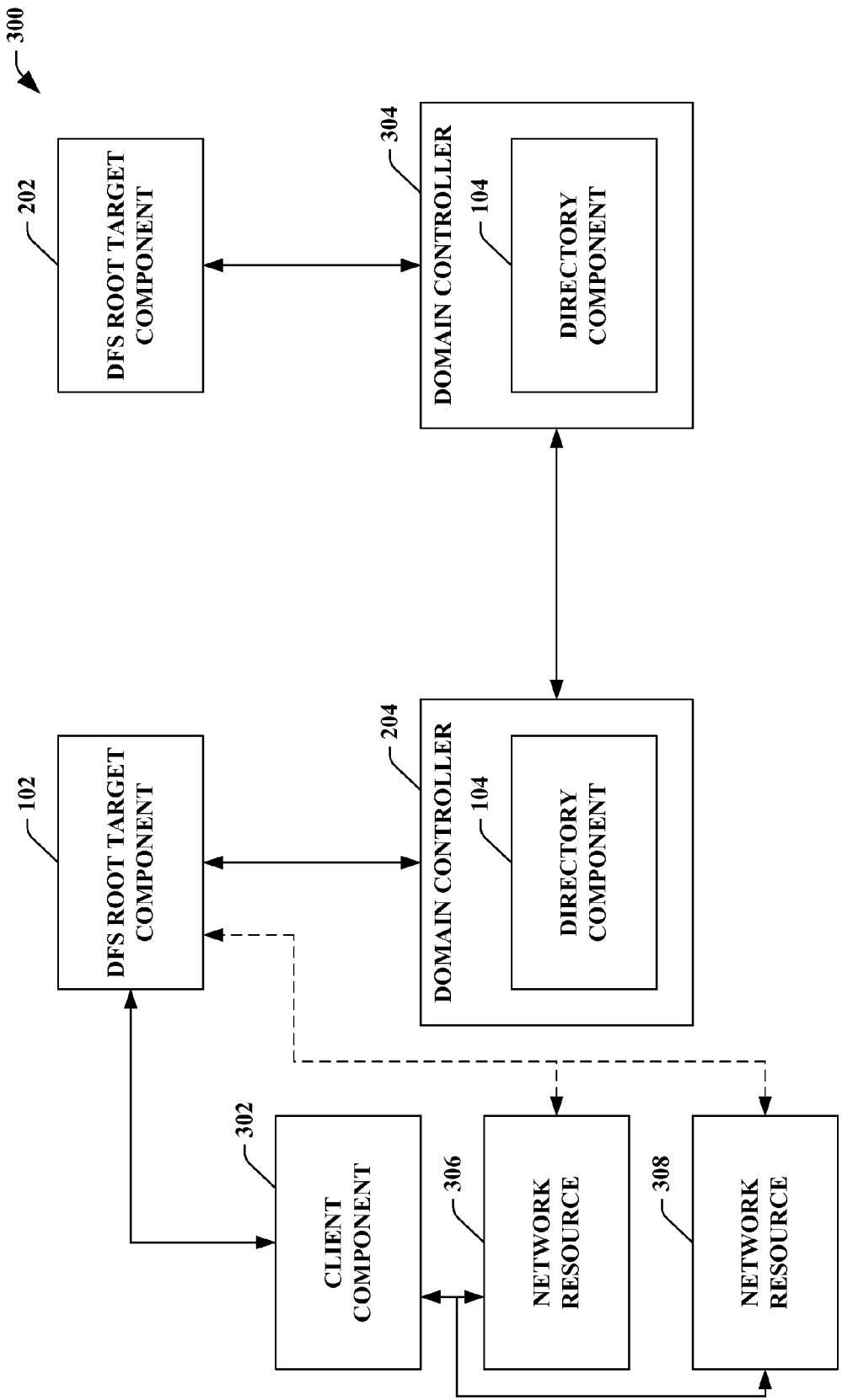
FIG. 3 illustrates a block diagram of an exemplary system that facilitates updating DFS data to multiple resources.

Turning now to FIG. 3, an example system 300 is displayed for establishing accessible DFS links among a plurality of network resources. DFS root target components 102 and 202 are provided to host one or more links to local or distributed (e.g., across a network) file system resources. A client component 302 is provided that can request access to a DFS namespace resulting in communication with DFS root target component 102 to create and/or obtain DFS link data. Domain controllers 204 and 304 are also provided having respective directory components 104 to provide directory services to one or more network resources. Additionally, network resources 306 and 308 are provided which can relate to one or more DFS links (as link targets, for example). It is to be appreciated that the network resources 306 and/or 308 can also perform functions of the client component 302, in one embodiment, and vice versa, though not shown here. In one example, DFS root target components 102 and 202 can respectively store metadata related to one or more DFS links in the respective directory components 104, related to a given DFS link, of one or more optimal domain controllers 204 and/or 304.

The DFS links can provide access to one or more distinct network resources 306 and/or 308, as described above, such that a user of a client component 302 requesting the link (e.g., client component 302) can view the resources without realizing machine boundaries. Additionally, the DFS links can relate to multiple shared resources on a single or multiple network resources (such as two folders on a given resource). Thus, in one example, the DFS root target component 102 can be utilized (by the client component 302, in one example) to create a DFS link comprising one or more shared resources of network resources 306 and/or 308. The DFS root target component 102 can utilize the directory component 104 of domain controller 204 to create a directory object corresponding to the DFS link. Moreover, metadata relating to the link (such as authorization, versioning, status, and other values described infra) can be stored as attributes of the object. Upon creating the object, additional DFS root target components connected to the domain controller 204 and/or 304 (e.g., DFS root target component 202 in FIG. 2) can be notified of the update or otherwise discover the update and accordingly update local representations as described supra. Furthermore, if a DFS link is updated or deleted by the DFS root target component 102 (requiring update of directory object information as described above) the update can be propagated out via incremental update or full synchronization as described. It is to be appreciated that the network resources 306 and/or 308 can be replicated through other network resources (or be replications of each other, for example), and the DFS root target component 102 can provide access to the network resources 306/308 and/or replications thereof for high availability of the resources. In one example, the DFS root target component 102 can choose the appropriate resource or replication based at least in part on a load balancing scheme.

With the DFS link information for one or more namespaces current in the DFS root target component 102, the updated DFS root target component 102 can provide information to access the DFS link and resources thereof (e.g., network resources 306 and/or 308) via the DFS root target component 102. The information can be delivered to a client component 302, for example, for use in requesting access to the link. Moreover, as depicted, the directory component 104 of domain controller 204 can be one of a plurality of directory components (e.g., including directory component 104 of domain controller 304) that function as a replicated database for a given domain. Thus, the directory data within the directory components 104 (including the DFS link data) can be synchronized using functions defined in the directory components. When the DFS root target component 102 updates DFS link data to the directory component 104 of the domain controller 204, the data can be propagated to the other directory components in the domain, including directory component 104 of domain controller 304 utilizing the predefined update mechanism for the directory services implementation. An update notification can be sent to the DFS root target component 202 (e.g., when the data is updated to the directory component 104 of domain controller 204 and/or 304), and the DFS root target component 202 can similarly query its closest directory component 104 (that within domain controller 304) to obtain the updated data. The update can be performed as described above (e.g., via full or incremental update synchronization). Subsequently, the updated data can be utilized by one or more network resources connected to the DFS root target component 202 (not shown). It is to be appreciated that DFS links defined by the DFS root target component 202 can be updated to and utilized by the DFS root target component 102 as well.

According to yet another example, the directory component 104 can comprise multiple versions of DFS metadata schemas. For example, the DFS root target component 102 and/or 202 can host multiple namespaces where each namespace can correspond to a different metadata schema in the directory component 104. Using version information, the directory component 104 can properly provide metadata to DFS root target components 102 and/or 202 to begin hosting a namespace, or for new DFS root target components added to a network, for example.

Figure 4:
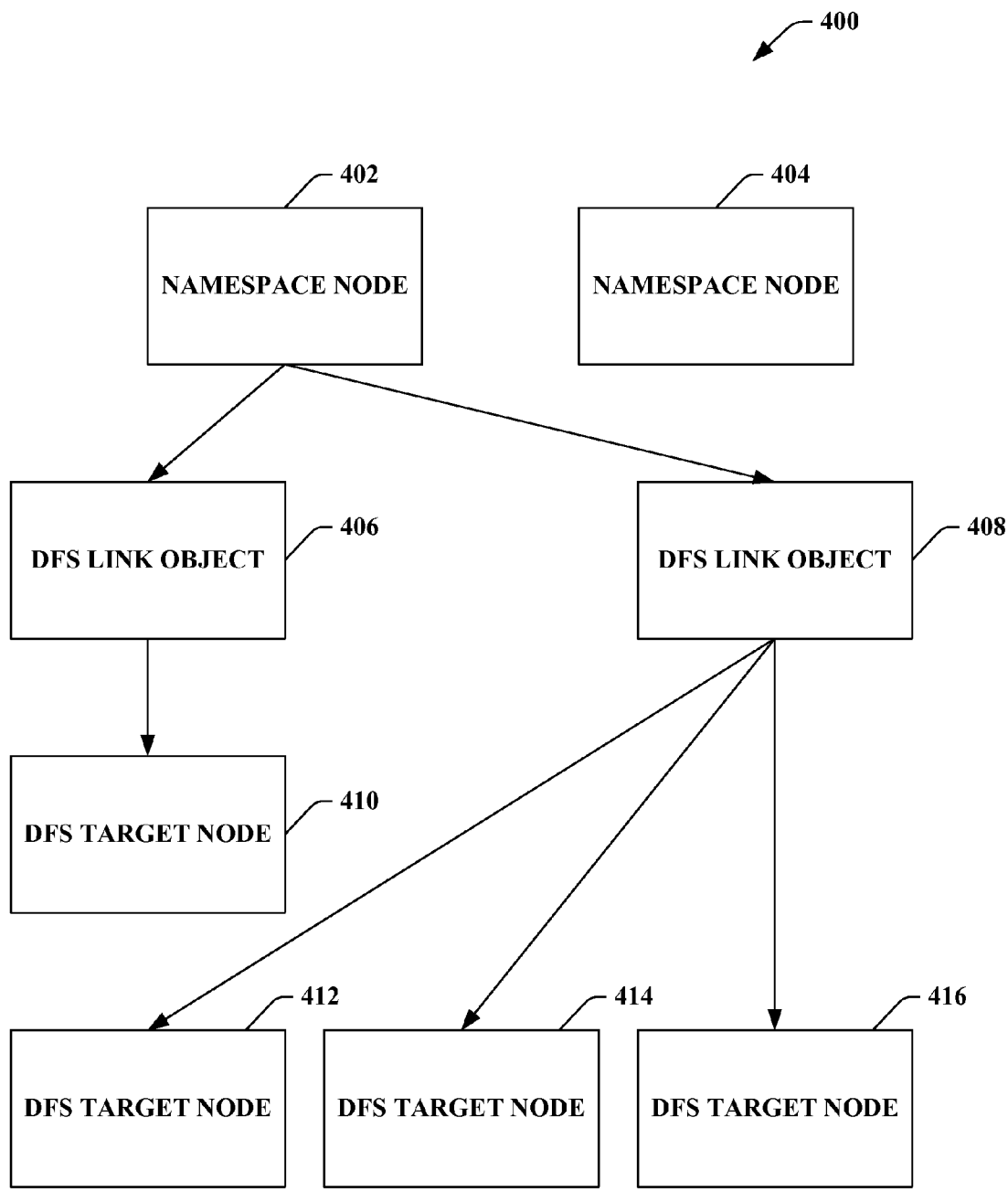
FIG. 4 illustrates a block diagram of an exemplary tree of DFS directory objects and nodes.

Turning now to FIG. 4, an example hierarchical DFS directory services layout 400 that can be used to represent a plurality of DFS links in one or more namespaces is illustrated. Namespace nodes 402 and 404 are provided which represent disparate namespaces that can be within a domain, for example, and can relate to a namespace anchor (not shown) in one example, which can be leveraged to provide version agnostic access to the namespaces—versioning is described in greater detail supra. Namespace node 402 has DFS link objects 406 and 408 that can represent an aggregation of one or more shared resources, such as DFS target nodes 410, 412, 414, and 416, respectively. According to an example, the DFS target nodes 412, 414, and 416 can each relate to a shared resource on a network where the resources are combined to produce a DFS link to which the DFS link object 408 relates. Metadata regarding the DFS target nodes 412, 414, and 416, for example, can be resident within the DFS link object 408; similarly, metadata regarding DFS target node 410 can be represented as attribute data within the DFS link object 406. The DFS link, as described, can be requested to provide transparent access to the shared resources such that they can appear as a single shared resource, for example. The DFS link object 406 can similarly provide access to the DFS target node 410 that can represent a shared network resource as well. DFS link objects 406 and 408 can relate to a namespace defined for the domain represented as namespace node 402. It is to be appreciated that more than one namespace can be defined for a given domain as well (as shown).

The DFS directory services layout 400 can be defined within a directory services implementation, for example, where the namespace nodes 402 and 404 can be represented as directory objects. Additionally, the DFS link objects 406 and 408 can be represented as separate directory objects having metadata to describe or correspond to the respective DFS target nodes 410, 412, 414, and 416. Thus, directory services functionality can be leveraged to provide additional service with respect to the object data and metadata. As described, relating DFS links to single directory objects provides for more granularity with respect to the links. For example, when a link, or data related thereto, is modified (e.g., DFS link object 406), only the single object need be updated to other replicated directory databases or DFS root nodes rather than an object related to the underlying namespace (such as namespace node 402, which can typically include the other DFS link data for the namespace as well).

This can be more efficient, for example, as the directory objects related to given updated links are likely going to be smaller in size than a directory object related to all links in a namespace. Additionally, when replicating data amongst directory databases and/or DFS root targets, an existing directory services search/query capability can be utilized to locate modified objects as described for increased efficiency as well. For example, one or more values in the specific directory object for a DFS link (such as DFS link object 406) can have data/metadata related to an updated and/or deleted status. To this end, a directory database, DFS root target, and/or other component can query the directory data using the directory services query mechanism to locate modified data, and update its own records accordingly. This efficient updating of metadata ensures replication between the various sources of data. As described, utilizing directory objects for each DFS link can enforce a schema on the link data for better conformity as well. For example, a schema for the attributes of DFS link objects 406 and 408 can have an entry relating to version information as described above to facilitate operability with one or more directory services implementations. Moreover, the object schema can have attribute values for identifying a resident namespace to which they belong, a unique identifier for the DFS link, an indication that one or more values have been modified, a last modified time, number of referral links, comments, properties, a list of the targets or shares that are a part of the DFS link, a link path for accessing the DFS link, security information, short names, and the like. Also, the DFS link objects 406 and 408 can have attributes including namespace anchor value, a namespace value to which the link relates (e.g., string, unique identifier, pointer, object class, and/or the like), a link to the metadata object, and a link to an object that is deleted (which can be referred to as a soft delete), for instance; the attributes can correspond to a schema as well. In this regard, the directory databases and/or DFS root targets can query for entries with the deleted link populated to determine which DFS links are inactive, for example.

According to another example, target nodes can be objects themselves for more granularity. Thus, the DFS target nodes 410, 412, 414, and 416 can relate to distinct directory objects to provide another level of abstraction. Therefore, data regarding the targets can acquire the benefits and functionalities of the directory services implementation as described supra including updating, searching, etc.

Figure 5:
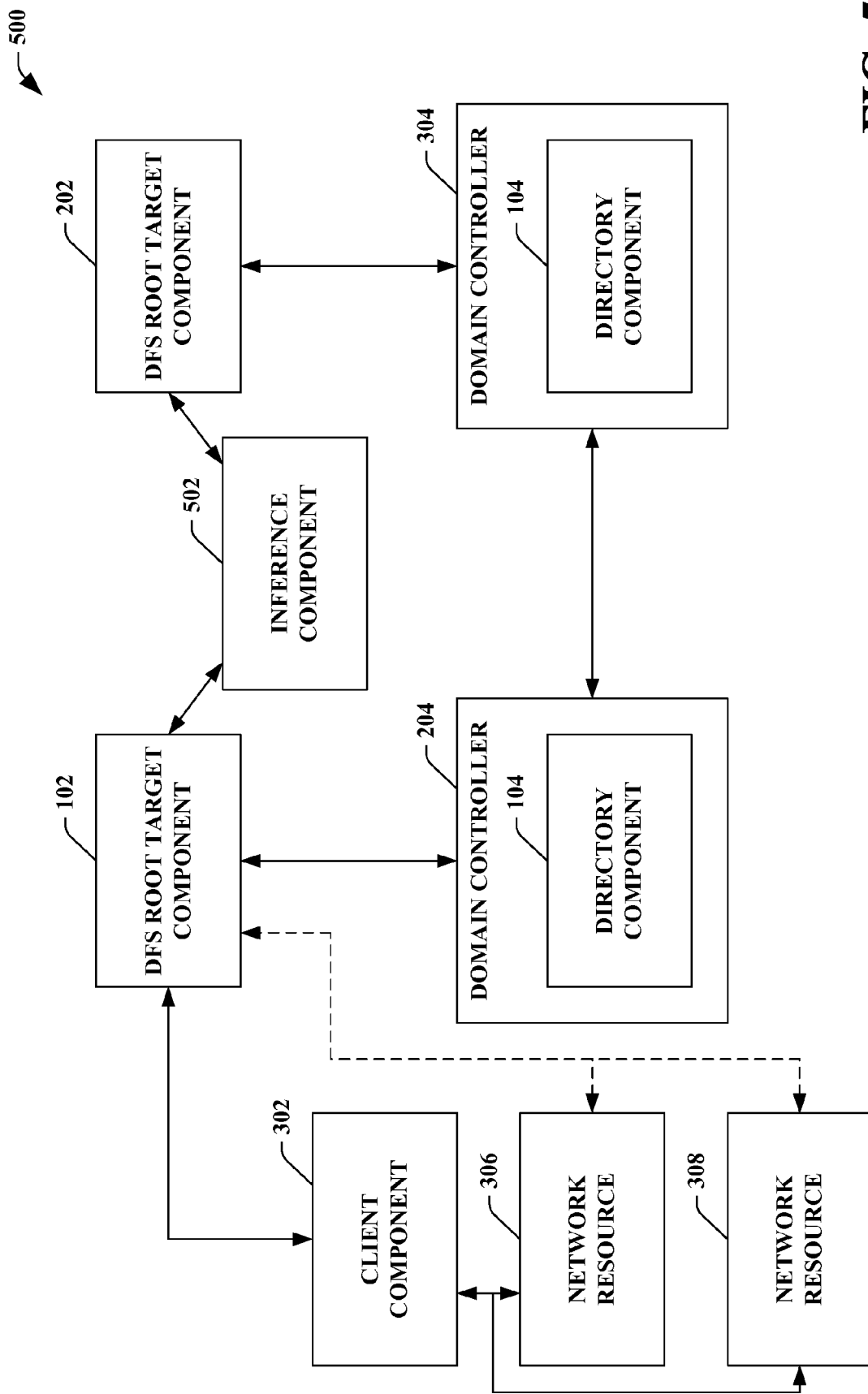
FIG. 5 illustrates a block diagram of an exemplary system that facilitates updating DFS data in a network environment.

Referring to FIG. 5, an example system 500 is shown for defining accessible DFS links in a network environment. DFS root target components 102 and 202 are provided to create and manage one or more DFS links for accessing by one or more client components 302 communicatively coupled thereto. Additionally, the domain controllers 204 and 304 include directory components 104 to store metadata for the respective DFS root target components 102 and 202 to ensure the data is consistent. Moreover, network resources 306 and 308 are shown to represent separate or combined use as one or more DFS links. Further, an inference component 502 is provided that can be utilized by the DFS root target components 102 and 202 to evaluate one or more inferences made regarding one or more DFS links, for example. In one example, the DFS root target components 102 and 202 can establish DFS links related to an aggregation of one or more shared network resources as described previously. Metadata related to the links can be populated and/or updated amongst the directory components 104 to ensure replication throughout. Moreover, the DFS root target components 102 and 202 can define the DFS links based at least in part on an inference made by the inference component 502, for example.

As described, the replicated directory components 104 of domain controllers 204 and 304 (and/or databases thereof) can be leveraged by respective DFS root target components 102 and 202 to store data related to one or more DFS links defined by the DFS root target components 102 and 202. In one example, the inference component 502 can infer a version for inputting metadata into one or more directory components 104; thus, if the directory component 104 and/or DFS root target component 102 and/or 202 supports an directory object per DFS link configuration, the DFS root target component 102 and/or 202 can input data accordingly. Also, the inference component 502 can predict a configuration for one or more directory components 104 and/or DFS root target components 102 and/or 202 based at least in part on network properties including number of computers, number of shares, environment variables, system uses, and the like. Moreover, the inference component 502 can allocate or define one or more DFS links based at least in part on previous configurations of other related or cross-domain DFS root target component. The previous configurations can additionally be implemented within the DFS root target component(s) 102 and/or 202 and effectuated based on a chosen server configuration (such as via a network setup or configuration interface, for example).

The inference component 502 can also be utilized for updating as well. For example, in a pull configuration, where the DFS root target components 102 and/or 202 can query the various other directory components 104 (such as a nearest one, for example) for updates regarding the DFS links, the inference component can be utilized to determine time intervals and/or events for updating. The inferred time intervals can be based on a number of factors, including but not limited to number of requests (or other demand based parameters), number of links in the namespace, location of the links and/or one or more of the comprised target shares, version, namespace, and/or substantially any internal or external measured data value related to the links, namespace, and/or individual components, for example. The inferences can also be used to update data between the directory components 104, for example. Moreover, the inference component 502 can be utilized to query for one or more DFS links (such as specific links or those satisfying certain properties), as described herein, based on a number of inferences. For example, DFS links can be added as directory objects based on the existence of other links according to similar configurations as inferred.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 6:
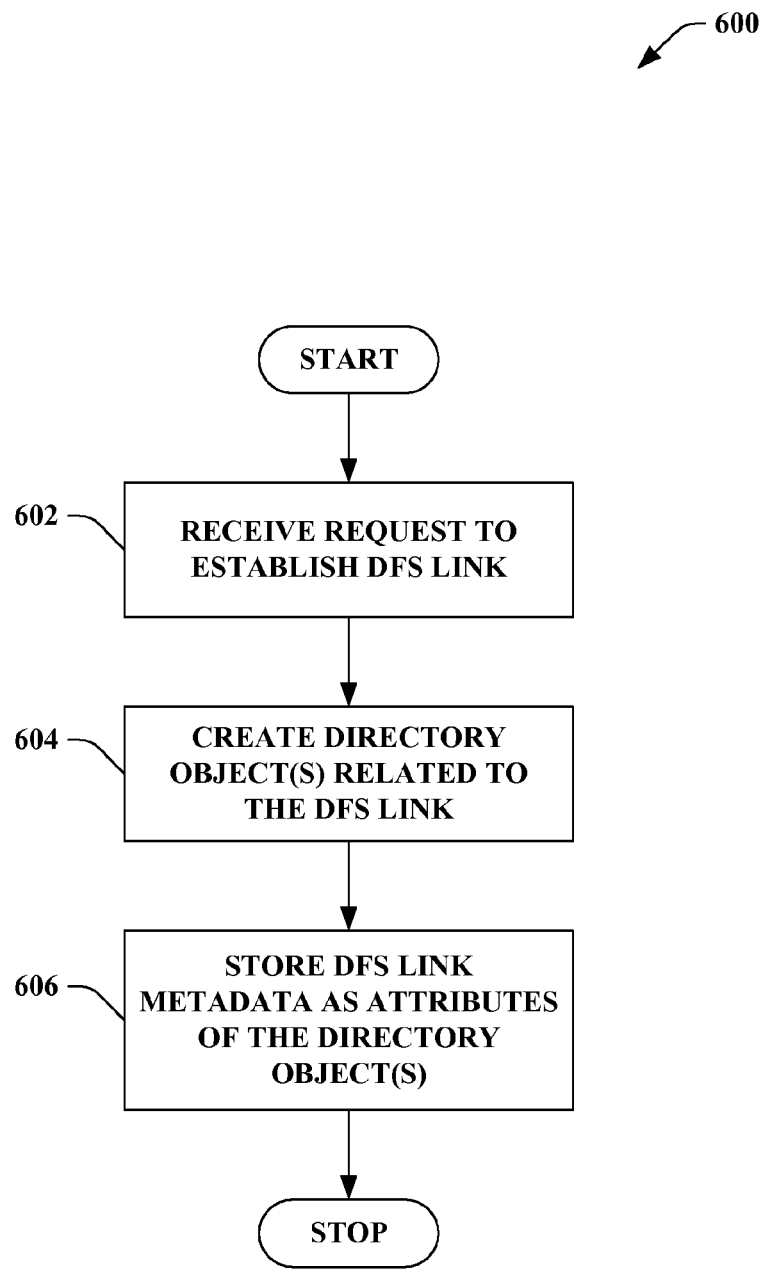
FIG. 6 illustrates an exemplary flow chart for creating a directory object corresponding to a DFS link.
Figure 7:
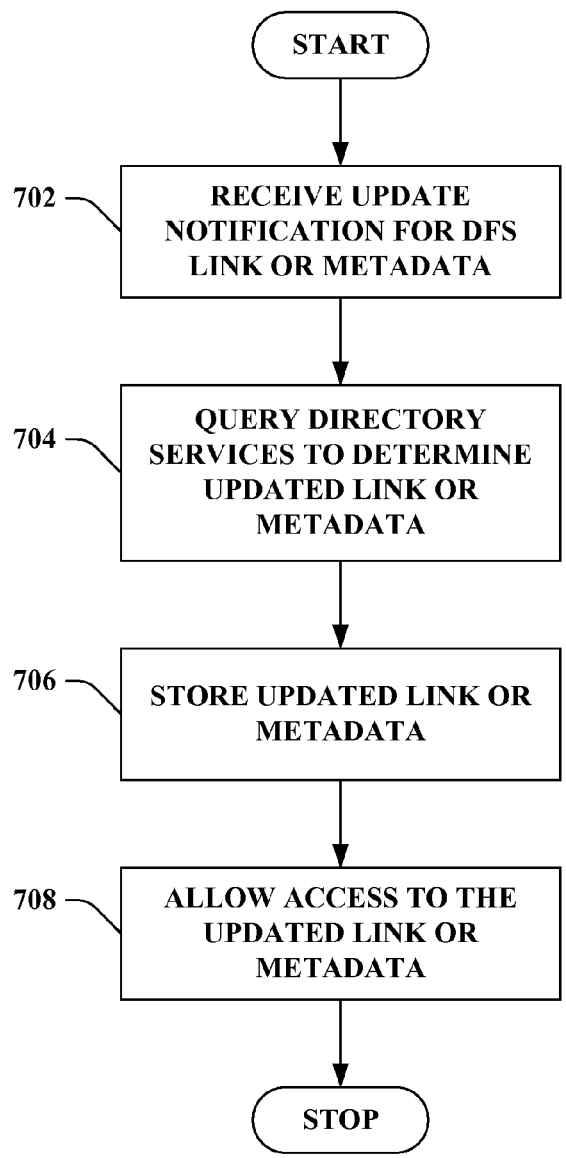
FIG. 7 illustrates an exemplary flow chart for updating directory data related to DFS links.
Figure 8:
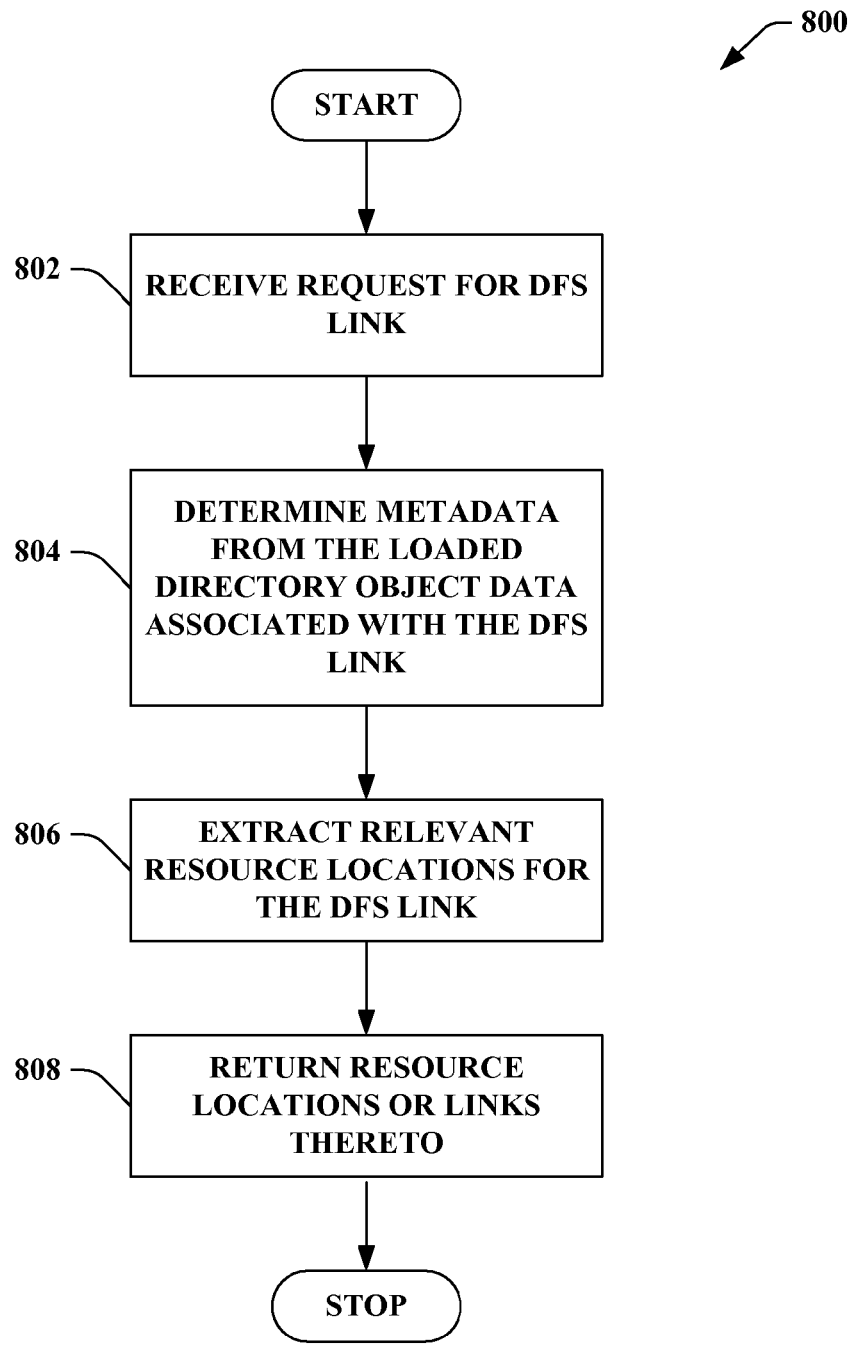
FIG. 8 illustrates an exemplary flow chart for providing access to DFS links via directory data.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 shows a methodology 600 for storing DFS link data as an instance of a directory object. As described, DFS link data can be stored in one or more directory objects to facilitate utilizing features available in a directory services implementation to provide more efficient updating and querying of the DFS links. At 602, a request to establish a DFS link is received. The request, for example, can be to create an aggregation of one or more network (or local) resources as a single DFS link. The link can appear as a single resource when requested though it is a combination of multiple resources, in one example. Resources defined by the DFS link can be verified in one example. For instance, the resources requested for aggregation can be disparate resources on a network; thus the status, existence, and/or availability of the resources can be verified to ensure an operable link, for example.

At 604, one or more directory object(s) related to the DFS link can be created. As described, the object(s) can relate to the DFS link and can comprise metadata as one or more attributes associated therewith. The metadata can relate to location of the verified resources; moreover, authentication information can be included in the metadata for accessing the verified resources and/or for accessing the DFS link. Additionally, the schematized fields described supra can also be included. At 606, the metadata can be stored as attributes of the directory object(s). By utilizing the directory object(s) to store data corresponding to the DFS link, the schema can be enforced on the link to ensure appropriate data is populated and to provide functionalities of directory services as described herein.

FIG. 7 illustrates a methodology 700 that facilitates updating directory services databases and/or DFS root targets upon addition, modification, or deletion of DFS link metadata (or links themselves). As described, DFS links can be stored as directory objects to leverage directory services functionality in updating the links, for example. At 702, an update notification can be received related to DFS link data or metadata. For example, upon updating information, such as by request of a DFS root target component, or the like, an update can be sent to notify other components of the update. The update can comprise updated information and/or can be an indication of updated data depending on the directory services implementation, for example. At 704, a query can be initiated to directory services to determine the updated data; this can be to one or more directory databases, for instance. As described, the query functionality of the directory services implementation can be used to compare one or more DFS links with one or more local links of a DFS root target to determine if metadata has been changed, a link deleted, and/or a link added, for example. It is to be appreciated that a deleted link can be a regular link with a deletion value indicated in the metadata, for example.

At 706, updated links or metadata can be stored, such as in a local memory of a DFS root target, for example. Since the DFS link relates to one or more distinct directory objects, only the directory objects for the link need be accessed for updating the data instead of a directory object related to substantially all links in a namespace. Where the link is a new link, the new link can be replicated as a new object in a DFS root target as well, for example. In this regard, one or more DFS root targets can be synchronized for a given domain to ensure members of the domain have access to the latest DFS links. Such access is allowed to the updated link or metadata at 708. Thus, metadata can be updated and utilized efficiently by leveraging directory services in this regard.

FIG. 8 shows a methodology 800 for providing access to DFS links having corresponding data stored in one or more directory objects related to each link. At 802, a request for a DFS link is received (e.g., a request to utilize a DFS link or portion thereof). The DFS link can relate to one or more resources (locally and/or on a network, for example); the resources can appear as a single source to an end-user (e.g., such that machine or resource boundaries can appear transparent). At 804, metadata can be determined from the loaded directory object associated with the requested DFS link (e.g., an object loaded into memory of DFS root target). For instance, the data can relate to the target locations of the link (e.g., the shared resources), authentication/authorization information, versioning, namespace, and/or the like. At 806, the relevant resource locations for the DFS link are extracted from the metadata. It is to be appreciated that authentication/authorization information for the links can be extracted as well to obtain the shared resource(s) thereof. At 808, the resource locations, or links thereto, can be returned for use in accessing the resources of the DFS link.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
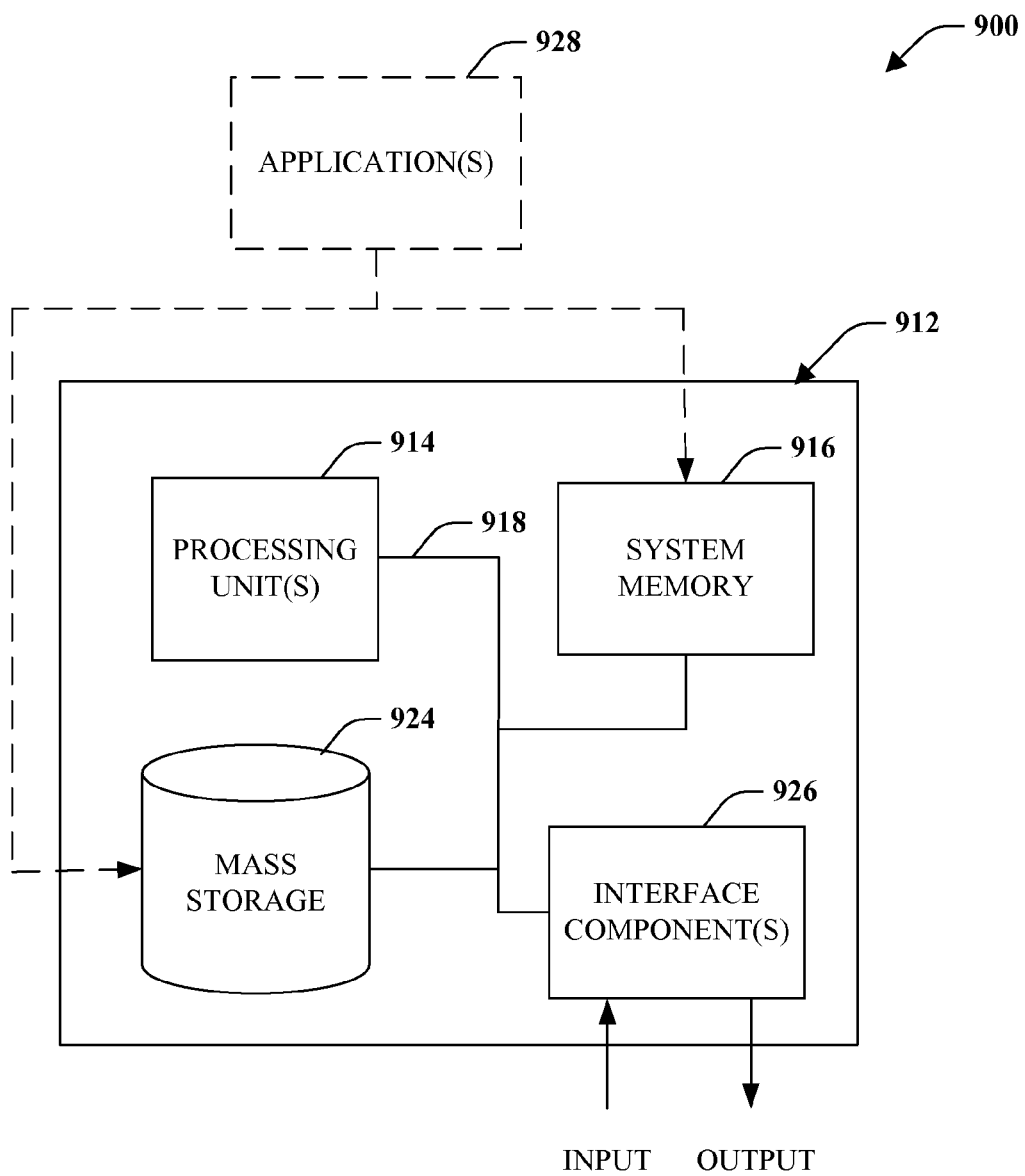
FIG. 9 is a schematic block diagram illustrating a suitable operating environment.
Figure 10:
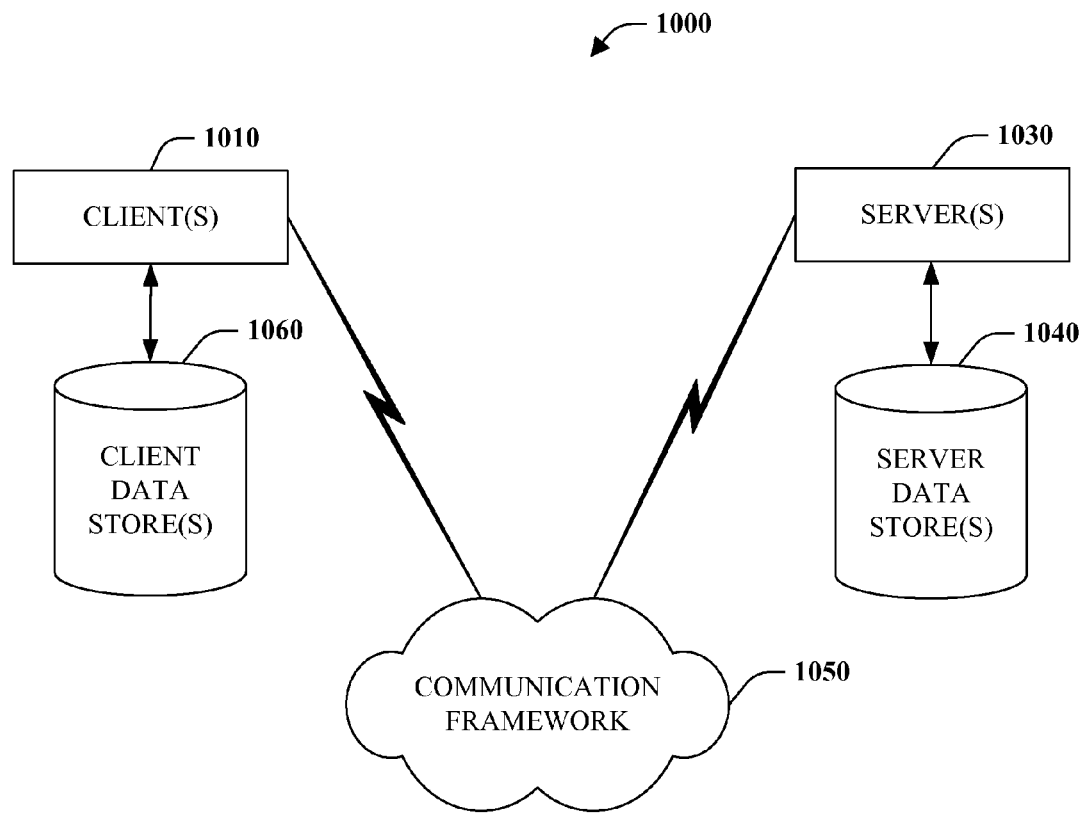
FIG. 10 is a schematic block diagram of a sample computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

According to an example, the processing unit(s) 914 can comprise or receive instructions to store one or more DFS links as directory objects where the mass storage 924 can store directory objects for a directory services implementation, for example. It is to be appreciated that the system memory 916 can additionally or alternatively house such instructions and the processing unit(s) 914 can be utilized to process the instructions. The processing unit(s) 914, in this regard, can also receive requests for the DFS links and access the directory objects of a DFS root target for example, to return the requested data. Moreover, the system memory 916 can retain and/or the processing unit(s) 914 can comprise instructions to effectuate updating of the directory objects to ensure replication with one or more additional operating environments, for example.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, one or more clients 1010 can desire access to or modification of one or more DFS links (which can have associated data stored in server data store(s) 1040, for example. The client(s) 1010 can submit a request to communication framework 1050, for instance, to update a DFS link; the server(s) 1030 can update the link data and store in sever data store(s) 1040. Additionally, the server(s) 1030 can update one or more other client(s) 1010 or server(s) 1030 via the communication framework 1050 with the new data to ensure effective replication throughout. Subsequently, the updated data can be available to one or more additional client(s) 1010 by requesting access from one or more server(s) 1030, for instance.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system for utilizing directory services to provide efficient maintenance of metadata related to distributed file system (DFS) links, by maintaining metadata regarding each DFS link in a single DFS namespace as attributes of one or more corresponding distinct directory objects, the system comprising at least one processor and memory for storing a plurality of components comprising:
   a DFS root target component that hosts at least one DFS namespace that includes a plurality of DFS links, each DFS link aggregating a plurality of network resources, the DFS root target component providing access to the plurality of DFS links to one or more clients, the DFS root target component storing locally a copy of metadata related to each DFS link to provide the access, the metadata comprising information for accessing and managing each DFS link, including authentication information for accessing each DFS link and versioning information for synchronizing the metadata between the DFS root target component and a directory services directory; and
   a directory component that provides the directory services directory and that synchronizes the metadata with the DFS root target component based on the versioning information, the directory component maintaining a distinct directory object for each of the plurality of DFS links in the at least one DFS namespace, each distinct directory object storing corresponding metadata related to a corresponding DFS link as one or more attributes of the distinct directory object, such that each of the plurality of DFS links of the at least one DFS namespace is represented by its own distinct directory object in the directory services directory.

2. The system of claim 1, the directory component utilizes a lightweight directory access protocol (LDAP) implementation to create the directory object as an LDAP object and to store the corresponding metadata as attributes of the LDAP object.

3. The system of claim 1, the directory component receives updated metadata from the DFS root target component.

4. The system of claim 3, the directory component notifies one or more disparate DFS root target components of the update.

5. The system of claim 1, the DFS root target component queries the directory component to retrieve directory objects useful to a given operation.

6. The system of claim 5, the operation is an update initiated upon receiving notification of occurrence of the update to the at least one directory object from a disparate DFS root target component.

7. The system of claim 6, the DFS root target component updates a local copy of metadata corresponding to the at least one directory object with the update.

8. The system of claim 1, the metadata related to each DFS link is conformed to a schema of the corresponding at least one directory object.

9. A method, implemented at a computing system that includes one or more processors, for utilizing directory services to provide efficient maintenance of metadata related to distributed file system (DFS) links, by maintaining metadata regarding each DFS link in a single DFS namespace as attributes of one or more distinct directory objects, the method comprising:
   an act of the computing system receiving metadata related to a first DFS link included in a plurality of DFS links that are associated with a single DFS namespace, the metadata comprising information for accessing and managing the first DFS link, including authentication information for accessing the first DFS link and versioning information for synchronizing the metadata between a directory services directory and a DFS root target that stores a local copy of the metadata;
   an act of the computing system storing the received metadata as attributes of one or more first distinct directory objects that uniquely correspond to the first DFS link, the one or more first distinct directory objects included in a plurality of directory objects stored in the directory services directory, each of the plurality of directory objects related to one of the plurality of DFS links associated with the single DFS namespace, such that each of the plurality of DFS links associated with the single DFS namespace is represented by its own one or more distinct directory objects stored in the directory services directory; and an act of the computing system providing access to the first DFS link by utilizing the attributes of the related one or more distinct directory objects to generate the link, the first DFS link usable by the DFS root target to provide access to the first link to one or more clients.

10. The method of claim 9, the metadata stored as attributes of the one or more first distinct directory objects comprises data regarding one or more network resources that are part of the first DFS link.

11. The method of claim 9, the one or more directory objects are implemented as relational objects of a relational database to allow relational database querying thereof.

12. The method of claim 9, further comprising updating the metadata related to the first DFS link within the one or more directory objects and providing notification of the update.

13. The method of claim 9, further comprising receiving an update notification related to one or more directory objects representing a DFS link in the namespace and querying a directory component to determine the updated metadata.

14. The method of claim 13, the update is a deletion of one of the plurality of DFS links in the namespace, the deletion is indicated as an attribute of the corresponding one or more directory objects.

15. The method of claim 13, further comprising updating the attributes of the one or more directory objects based at least in part on the determined updated metadata to provide replication of the one or more directory objects.

16. The method of claim 9, further comprising schematizing the metadata related to the first DFS link to that of the one or more directory objects.

17. One or more computer readable storage device storing computer executable instructions which, when executed by a computing processor, perform the following functionality:

receiving metadata related to a first DFS link included in a plurality of DFS links that are associated with a single DFS namespace, the metadata comprising information for accessing and managing the first DFS link, including authentication information for accessing the first DFS link and versioning information for synchronizing the metadata between a directory services directory and a DFS root target that stores a local copy of the metadata;

storing the received metadata as attributes of one or more first distinct directory objects that uniquely correspond to the first DFS link, the one or more first distinct directory objects included in a plurality of directory objects stored in the directory services directory, each of the plurality of directory objects related to one of the plurality of DFS links associated with the single DFS namespace, such that each of the plurality of DFS links associated with the single DFS namespace is represented by its own one or more distinct directory objects stored in the directory services directory; and providing access to the first DFS link by utilizing the attributes of the related one or more distinct directory objects to generate the link, the first DFS link usable by the DFS root target to provide access to the first link to one or more clients.

18. The one or more computer readable storage device of claim 17, wherein the computer executable instructions, when executed, further perform the following:

updating the metadata within distinct one or more directory objects corresponding to a first DFS link in a first DFS namespace based at least in part on the versioning information, the remaining multiple directory objects corresponding to the other DFS links in the first DFS namespace are unaffected by the update.

19. The method of claim 9, further comprising deleting the first DFS link as a result of synchronizing the metadata between the directory services directory and the DFS root target and determining that the one or more first distinct directory objects include an attribute that indicates deletion.

20. The method of claim 9, wherein the metadata further comprises: a unique identifier for the DFS link, a last modified time, a list of targets or shares that are part of the DFS link, and a link path for accessing the DFS link.

* * * * *